(12) United States Patent
Ryhorchuk et al.

(10) Patent No.: US 6,904,542 B2
(45) Date of Patent: Jun. 7, 2005

(54) SYSTEM FOR GROUP-BASED DISTRIBUTED PROTECTION SWITCHING

(75) Inventors: Kent Ryhorchuk, Sunnyvale, CA (US); Eric Allard, Milpitas, CA (US)

(73) Assignee: Ciena Corporation, Linthicum, MD (US)

( * ) Notice: Subject to any disclaimer, the term of this patent is extended or adjusted under 35 U.S.C. 154(b) by 473 days.

(21) Appl. No.: 10/096,095

(22) Filed: Mar. 11, 2002

(65) Prior Publication Data

US 2003/0172319 A1 Sep. 11, 2003

(51) Int. Cl.⁷ .................................................. G06F 11/00
(52) U.S. Cl. .............................. 714/27; 714/4; 714/43
(58) Field of Search ................................ 714/4, 43, 27; 370/217

(56) References Cited

U.S. PATENT DOCUMENTS

| | | | | |
|---|---|---|---|---|
| 6,052,733 A | * | 4/2000 | Mahalingam et al. | 709/235 |
| 6,370,155 B1 | * | 4/2002 | Cantwell et al. | 370/465 |
| 6,587,470 B1 | * | 7/2003 | Elliot et al. | 370/404 |
| 6,594,776 B1 | * | 7/2003 | Karighattam et al. | 714/4 |
| 6,763,479 B1 | * | 7/2004 | Hebert | 714/4 |
| 2003/0145117 A1 | * | 7/2003 | Bhat | 709/249 |

* cited by examiner

*Primary Examiner*—Robert Beausoliel
*Assistant Examiner*—Yolanda Wilson
(74) *Attorney, Agent, or Firm*—Michael R. Cammarata; Shailendra Bhumralkar; Daniel D. Tagliaferri

(57) ABSTRACT

System for providing distributed group-based protection switching at a network element in a communication network. The communication network includes a plurality of interconnected network elements, and wherein the network element includes first and second card logic coupled to the communication network to transmit and receive network traffic. The system comprises selector logic distributed between the first and second card logic that includes first and second switching engines that have associated activity states that indicate how the network traffic is routed at the network element. The switching engines generate new activity states based on selected fault indicators. A processing system operates to detect fault conditions, generate the selected fault indicators, and receive the new activity states from the switching engines to perform one or more switch reconfigurations at the network element based on the new activity states, and thereby implement the distributed group-based protection switching.

6 Claims, 8 Drawing Sheets

SYSTEM FOR GROUP-BASED DISTRIBUTED PROTECTION SWITCHING

FIELD OF THE INVENTION

The present invention relates to a switching system for use in a communication network, and more particularly, to a system for group-based distributed protection switching in a communication network.

BACKGROUND OF THE INVENTION

Communication networks are becoming widely used for distributing both high and low speed data over varying distances. Typically, a communication network is comprised of a number of network elements (NE) that are connected to each other in a variety of configurations so as to form a unified communication network. The communication network may extend over a small area, such as a company wide network, or may cover large distances, such as in regional or nationwide networks. The NE's allow network clients to input data for transmission over the network and to receive data transmitted over the network from other locations. Thus, data may be added to, or dropped from the network at NE locations, as the data flows from point to point throughout the network.

One problem associated with communication networks is the problem of protection switching. In one situation, protection switching involves the process of switching network traffic from one network transmission path to another in the event of a network failure. For example, in a ring network, network traffic moves around the ring from network element to network element. In the event of a network failure, for example, a failure where a network link is damaged or broken, network traffic is switched so that is it routed away from the failure. Thus, traffic that is initially flowing in a clockwise manner around the ring is switched to flow in a counterclockwise direction that is away from the failure.

In another protection switching technique, typically used in ring networks, the network traffic is transmitted over working and protection transmission paths that flow in different directions over the network to the same destination. In the event of a network failure, either the working or protection transmission path will be selected to deliver the network traffic to the network element at the final destination.

FIG. 1 shows a typical protection switching arrangement in a network element 100 that includes a pair of line cards 102, 104 that are coupled to a communication network. Assuming the network traffic is bridged, line card 102 receives working traffic and line card 104 receives protection traffic. Typically, high-speed network transmissions include a number of low speed channels, which the line cards extract from the working and protection transmissions. A channel output from the two line cards is cross-coupled to a pair of switch cards 106, 108. The switch cards output one of the inputs they receive to an output device 110 for output to a local user's equipment 112.

The switch cards 106, 108 include selection logic on each card to determine which of the traffic signals at their input will be provided at their respective output. Thus, each switch card makes it own determination whether to provide a channel from the working or protection traffic to the output device. Lastly, the output device determines from the traffic signals it receives, which signal will be output to the local user.

The arrangement described above may be used as part of a synchronous optical network (SONET) and is commonly referred to as a cross-connected SONET protection system. In a complete implementation, redundant switch cards, identical to switch cards 106, 108, are provided to switch each of the channels in the network traffic upon the occurrence of a network fault. Unfortunately, this means that it is necessary to have a separate switch matrix for each channel in the network transmission, where each switch matrix is made up of two separate switch cards coupled to the individual line cards, respectively. This type of arrangement has the disadvantages of complexity and high cost, since it requires several different types of circuits. Furthermore, when a network fault occurs, it is necessary for multiple switching events to occur to switch all of the traffic, where the switching events happen independently from each other. As a result, the system lacks efficiency.

Another typical implementation for protection switching in a network includes a centralized processor performing protection switching using a simple selection algorithm. However, such an implementation is not tolerant to failure of the centralized processor. In addition, a centralized processor controlling several independent peripheral pieces of switching hardware must communicate independently with each of them, thereby increasing the complexity of the system.

Therefore, it would be desirable to have a system to perform protection switching in a communication network that does not involve a centralized processor and that does not require complex, independent switching circuits that are costly and inefficient.

SUMMARY OF THE INVENTION

The present invention includes a distributed group-based switching system to perform protection switching in a communication network. The group-based protection switching strategy involves switching several segregated traffic segments concurrently under certain fault conditions. For example, in a SONET network, where network elements include add/drop multiplexers (ADM) that provide a way to add or drop multiple signals to/from the network, a group-based switching system is included that provides protection against optical fiber, circuit pack, or backplane failures.

In one embodiment of the invention, the ADM consists of two similar circuit cards placed adjacent to each other with dedicated backplane traces that allow control and payload data to be passed between them. The ADM further includes a selection system operating over both cards to implement one or more protection mechanisms. For example, one protection mechanism provided as part of a unidirectional path switched ring (UPSR), selects between a set of working timeslots and a set of protection timeslots, from east and west inputs to the ADM based on a quality indicator. For example, in one situation, the protection mechanism considers a loss of pointer (LOP) as a failure condition that causes a protection switch to occur.

In one embodiment, the selection system decides which set of timeslots to drop out at a low-speed tributary port that can be located on either card. In one configuration for this protection mechanism, sixteen optical carrier (OC-3) drops are possible from a pair of ADM cards, which means that up to sixteen protection switches are performed concurrently. As a result, a distributed group-based switching mechanism is provided.

The distributed group switching mechanism included in the present invention provides two major benefits. First, there is no reliance on a single central processor for performing protection switching. Second, the concurrentswitching scheme is very efficient, thereby allowing fast switching to be performed with relatively inexpensive components and a backplane communication mechanism.

In one embodiment of the invention, a system for providing distributed group-based protection switching at a network element in a communication network is provided. The communication network includes a plurality of interconnected network elements, and wherein the network element includes first and second card logic coupled to the communication network to transmit and receive network traffic. The system comprises bus logic coupled between the first and second card logic. The bus logic operates to transmit the network traffic between the first and second card logic. The system also comprises selector logic distributed between the first and second card logic and operable to receive the network traffic, and wherein the selector logic includes first and second switching engines that have associated activity states that indicate how the network traffic is routed at the network element, and wherein the switching engines generate new activity states based on selected fault indicators. The system also comprises a a processing system operable to detect fault conditions and generate the selected fault indicators, and wherein the processing system operates to receive the new activity states from the switching engines and perform one or more switch reconfigurations at the network element based on the new activity states to implement the distributed group-based protection switching.

In another embodiment of the invention, a method for providing distributed group-based protection switching at a network element in a communication network is provided. The communication network includes a plurality of interconnected network elements, and wherein the network element includes first and second card logic coupled to the communication network to transmit and receive network traffic. The method comprises steps of busing the network traffic between the first and second card logic, defining at least one selector that includes a first switching engine at the first card logic and a second switching engine at the second card logic, initializing the first and second switching engines to have selected activity states, detecting a fault condition, determining new activity states for the first and second switching engines based on the fault condition, and reconfiguring the first and second card logic based on the new activity states to implement the distributed group-based protection switching

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION OF THE INVENTION

Figure 1:
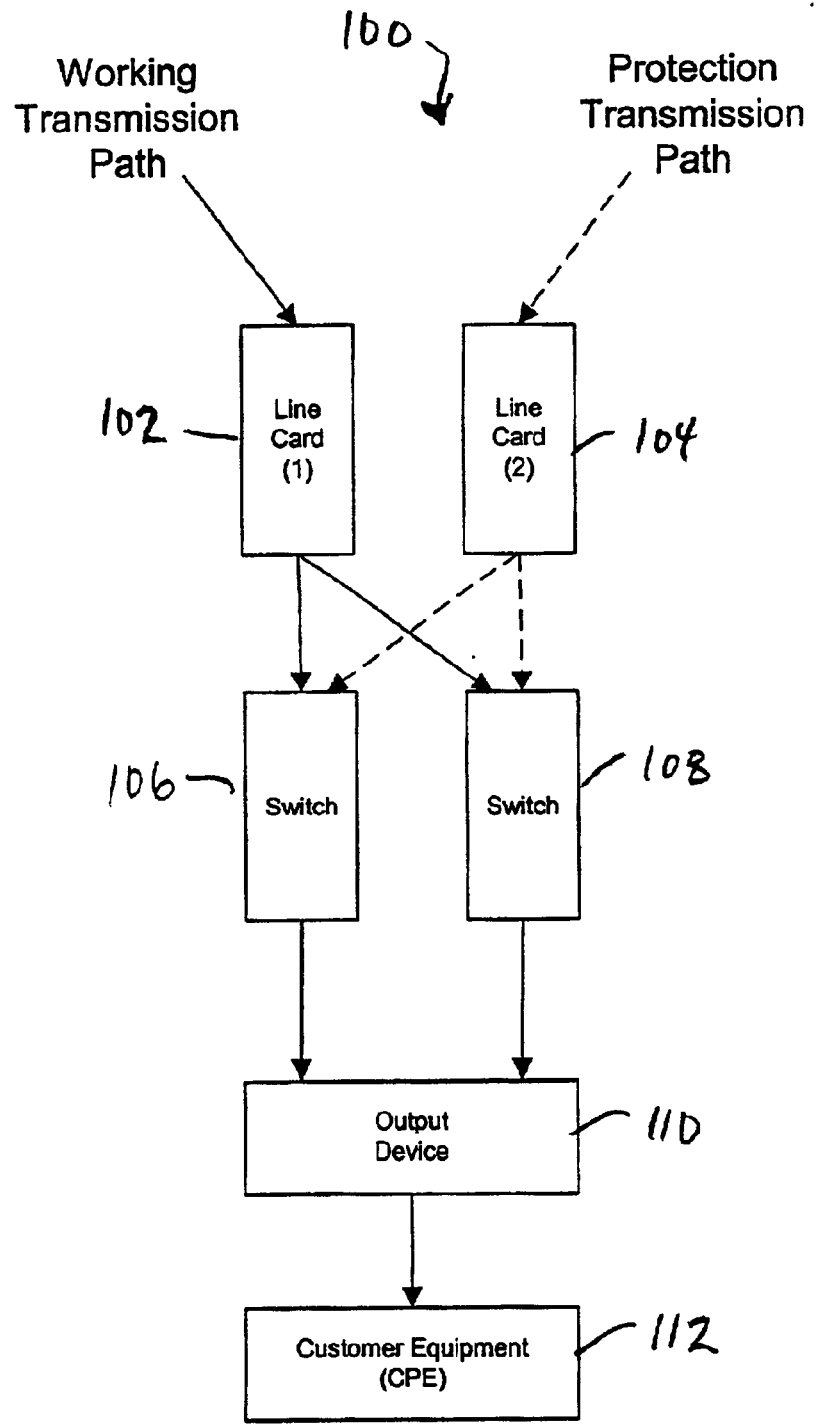
FIG. 1 shows a typical protection switching arrangement in a network element.

The present invention includes a distributed group-based switching system to perform protection switching in a communication network. For example, in one embodiment of the invention, a network element in the communication network includes an ADM that consists of two similar circuit cards placed adjacent to each other with dedicated backplane traces that allow control and payload data to be passed between them to effectuate group based switching. Thus, various embodiments of the system included in the present invention are discussed in detail in the following text.

Exemplary Embodiment

In one or more embodiments included in the present invention, a group-based switching system is implemented in association with an ADM. The switching system is fully independent of any centralized processor, and the system can be incorporated into several protection switching strategies. For example, 1+1 architecture is an architecture in which the head-end signal is continuously bridged (at the electrical level) to working and protection equipment so that the same payloads are transmitted over the network identically to the tail-end working and protection equipment. At the tail end, the working and protection signals are monitored independently and identically for failures. The receiving equipment chooses either the working or the protection signal as the one from which to select the traffic.

Protection switching can result based on the occurrence of one or more fault conditions. For example, the fault conditions can include, but are not limited to, loss of signal (LOS), loss of frame (LOF), loss of pointer (LOP), signal failure due to bit-error-rate (BER), signal degradation, alarm indication signal (line) (AIS-L), or alarm indication signal (path) (AIS-P). Furthermore, a fault can occur in either the working or the protection path. Thus, protection strategies that can be realized include, but are not limited to, the following.

1. Optical UPSR protection.
2. SONET-style UPSR protection.
3. SONET 1+1 tributary protection.

In one embodiment, the protection switching mechanism includes a system that effectively implements one or more selectors that include switching engines that choose either the working or protection traffic, and causes the network element hardware to be configured accordingly should a fault condition occur.

In one embodiment, the selector is a distributed software application that runs on hardware located on both circuit cards of an ADM. One "half" of the selector performs the task of processing working network traffic, and the other half of the selector performs the task of processing protection network traffic. Each half of the selector may be referred to as a "switching engine" and each switching engine has a "state" associated with it that is defined to be either an active or a standby state. The engines communicate and execute a protocol that, except at the exact moment of switching, guarantees that one engine of the selector is in the standby state and the other engine is in the active state. The active state engine corresponds to the traffic selected by the selector.

For each protection scheme there may be multiple selectors that run concurrently. Those selectors form what can be referred to as a "switching group." In one embodiment, the switching group is a software entity that has the following responsibilities.

1. Monitors the fault status of the incoming traffic and notifies the individual switching engines as necessary.
2. Implements the protocol communications for the individual switching engines using batch processing techniques.
3. Accesses lower level APIs to perform group protection switching based on the activity state of the engines.

In one embodiment, the switching group performs the above activities using batch processing. For example, batch processing is used in a situation where an LOS condition appears on an OC-48 input to an ADM, and where SONET-style UPSR protection is to be performed. First, the switching group (one or more selectors) receives notification of the fault from a fault correlator associated with the ADM. The switching group informs each switching engine about the fault. Second, the switching group collects protocol messages from each engine and compresses, packages, and transports them in a single message to the associated processor on the mating card of the ADM. Third, after some switching group collects those states and sends them to a lower level switch interface (API) that computes and executes a switching solution for the ADM hardware. Thus, as a result of the fault, a batch process is used to perform a group switch, whereby the ADM hardware is reconfigured to select the best network data. Such a batch processing system is fast, efficient and implemented by a distributed system that is not dependent on a central processing system.

Figure 2:
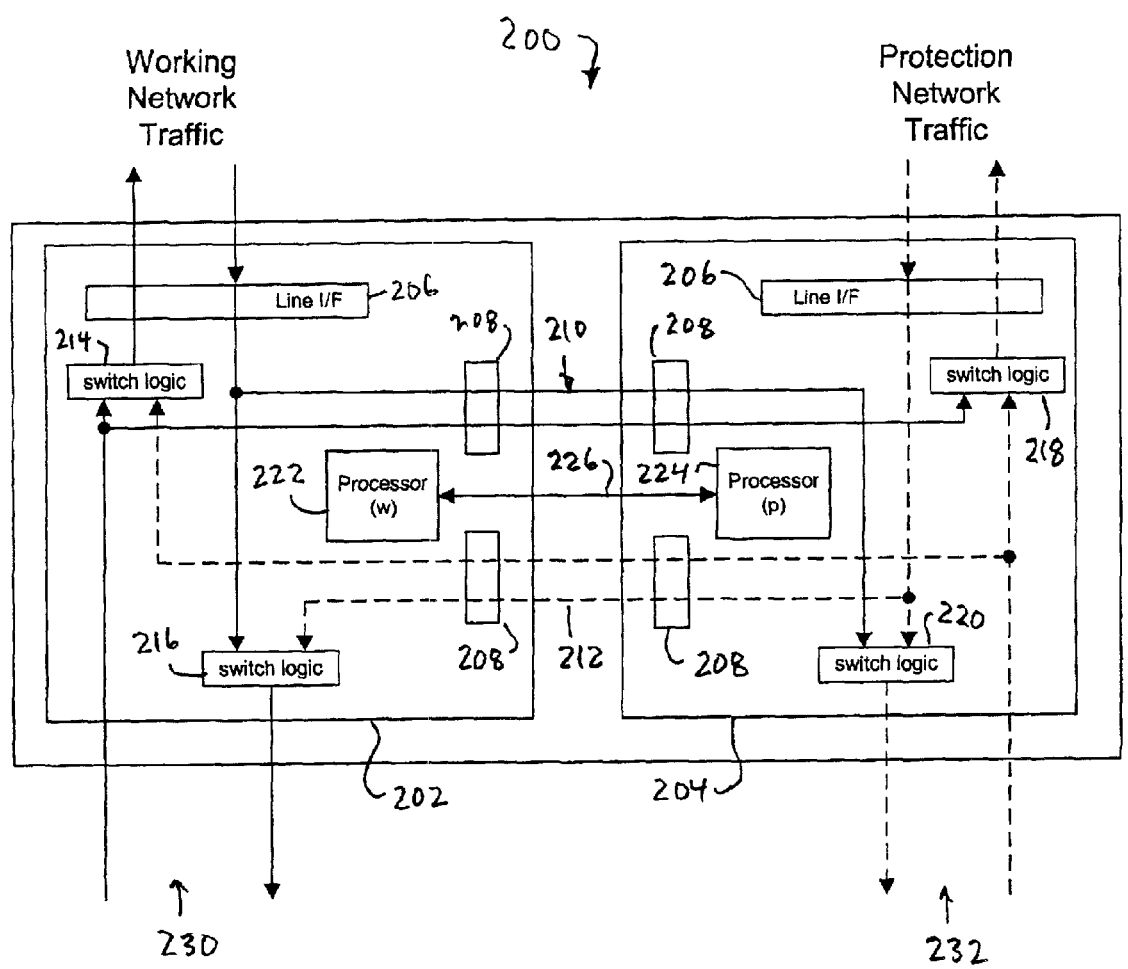
FIG. 2 shows a functional diagram of a network element that includes an ADM module constructed in accordance with the present invention.

FIG. 2 shows a functional diagram of a network element 200 that includes an ADM module constructed in accordance with the present invention. The ADM includes a first circuit assembly 202 and a second circuit assembly 204. The circuit assemblies include line interface logic 206 that allows the circuit assemblies to communicate with other network elements via a communication network. For example, during network communication where the network traffic is bridged, the first circuit assembly 202 transmits and receives working traffic and the second circuit assembly 204 transmits and receives protection traffic. It is also possible to couple the network element 200 to a communication network using other configurations instead of the bridged traffic configuration.

The circuit assemblies 202, 204 also include bus logic 208 that forms two high-speed buses between the circuit assemblies. For example, first and second high-speed buses are formed as shown at 210 and 212, respectively. The high-speed buses are used to communicate working and protection traffic between the circuit assemblies 202, 204. Furthermore, traffic switch logic 214, 216, 218, and 200 are used to switch between working and protection traffic at various points within the circuit assemblies 202 and 204.

The ADM circuit assemblies also include processors 222 and 224. The processor 222 is located on the first circuit assembly 202 and the processor 224 is located on the second circuit assembly. The two processors are coupled to all the components within their respective circuit assembly. Furthermore, the two processors can communicate with each other via a communication channel 226. The processors may comprise any type of microprocessor, micro-controller, CPU, gate array, programmable logic or any other type of processing hardware and/or associated software.

The ADM circuit assemblies include working 230 and protection 232 interfaces that can be coupled to local customer equipment. However, it should be noted that each of these interfaces may carry either working or protection traffic based on the operation of the circuit assemblies and the switch logic. Therefore, it is possible for the network element 200 to transmit and receive bridged network traffic, and to add/drop selected channels based on the operation of the processors 222, 224 and the switch logic. For example, the network element 200 may receive bridged network traffic, determine that a fault condition exists with respect to the received working traffic, and as a result, transmit protection traffic to the line card 202, via bus 212, and reconfigure the switch logic 216 to output signal channels in the protection traffic to the local user via output 230.

As defined above, a selector is a distributed software application that runs on hardware located on both circuit cards of an ADM. One "half" of the selector performs the task of processing working network traffic, and the other half of the selector performs the task of processing protection network traffic. Each half of the selector may be referred to as a "switching engine" and each switching engine has a "state" associated with it that is defined to be either an active or a standby state. For example, with reference to FIG. 2, one switching engine may be defined to include processor 222 and switch logic 216. A second switching engine may be defined to include processor 224 and switch logic 220. Thus, the two switching engines form a selector that includes a distributed software application that runs on both ADM cards. The engines communicate and execute a protocol to determine which engine is in the standby state, and which is in the active state. In accordance with the present invention, it is possible to define multiple selectors per ADM.

Figure 3:
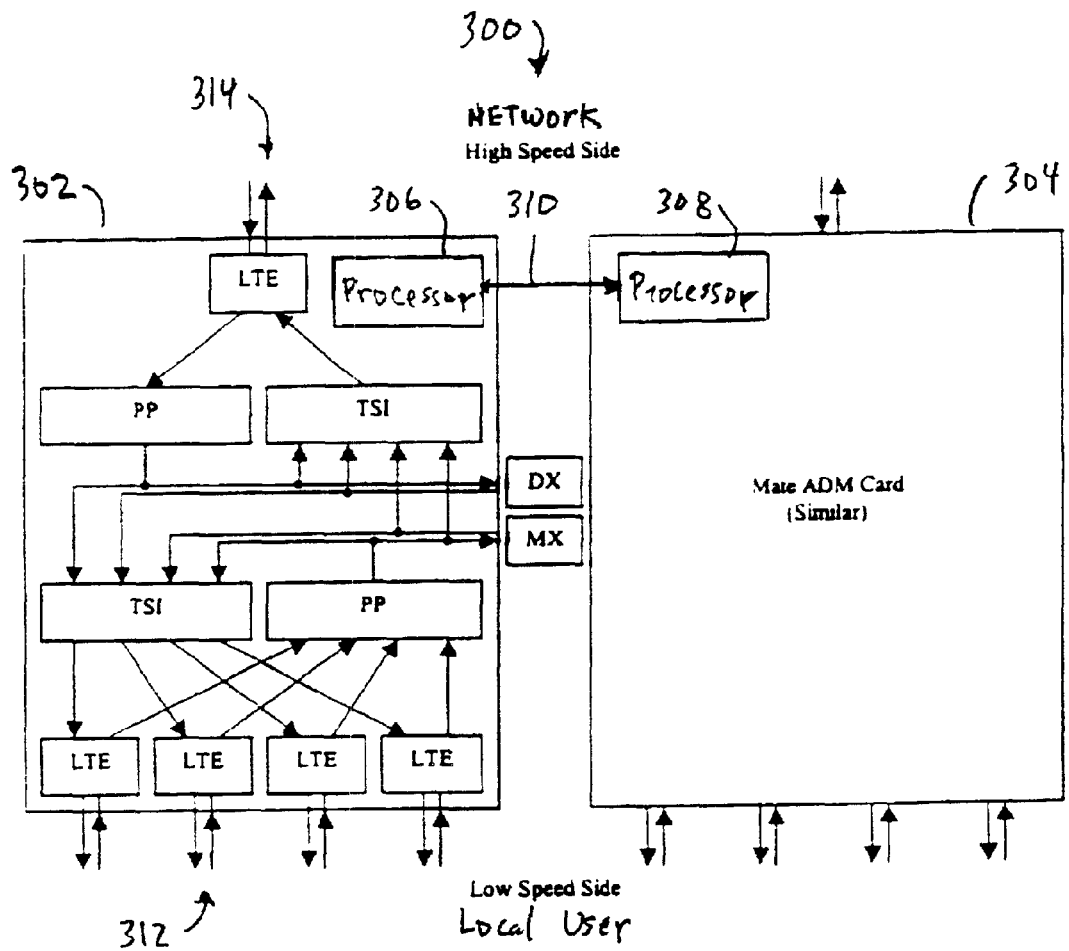
FIG. 3 shows a detailed diagram of an ADM module constructed in accordance with the present invention.

FIG. 3 shows a detailed diagram of one embodiment of an ADM 300 constructed in accordance with the present invention for use in a network element, for example, for use in the network element 200. The ADM consists of two card assemblies 302, 304 and each card assembly includes the following components.

1. SONET line terminating overhead processors and generators (LTE). The LTEs provide overhead monitoring and alarm surveillance for the optical inputs to the card, and insert the overhead for the optical outputs. In one embodiment of the invention, there are two classes of LTEs—high speed and low speed. For example, assuming that the ADM 300 is an OC-192 ADM module, then each card assembly will have 4 low speed LTE interfaces (OC-48), as shown at 312, and one high speed interface (OC-192), as shown at 314. However, other ADM types are possible and the use of the LTEs in those other types is consistent with the description herein.
2. Pointer processors/generators (PP). The PPs serve two protection functions. First, they monitor the incoming network traffic timeslots for AIS-P and LOP conditions, and second, they provide the ability to insert AIS-P on outgoing STS channels that form outgoing network traffic.
3. Protection buses. The protection buses are used to exchange data between a pair of ADM cards. There are two protection buses and each has enough capacity to transport the full bandwidth of the card. The two buses are called MX and DX—MX transports a copy of the low speed data to the mate card, DX does the same for the high speed data.
4. Time slot interchanger (TSI). This component lies after the pointer processor (PP) and allows the connection of any of its input timeslots to any of its output timeslots. Each card in an ADM has two TSIs—one to select the data for the low speed outputs, and another to select the data for the high speed output. The output of the TSI goes to the LTE blocks where it is framed and the line and section overhead is inserted. The input comes from four sources—the high-speed data receive from the network, the low speed data received form the local user, and both protection buses. Switching can always be done at the STS-1 level.

5. Processors 306 and 308. The processors are coupled to all components within their respective ADM circuit assembly (connections not shown for clarity purposes). The processors are also coupled together via a communication channel 310 so that the processors may communicate operational messages to each other. The processors operate to receive or detect fault conditions, control the PPs and TSIs, and send messages to the processor on the mating circuit assembly.

Therefore, in accordance with one embodiment included in the present invention, one or more selectors can be defined where each selector comprises two switching engines with one switching engine operating on each ADM card. For example, with reference to FIG. 3, a selector can include any combination of PP, TSI, and LTE functions to define a switching engine on each ADM card. Such a selector operates in conjunction with the processor on each respective card. All defined selectors then operate to respond to network fault conditions so that their associated switching engines simultaneously group-switch to reconfigure the cards of the ADM in response to the network fault.

Figure 4:
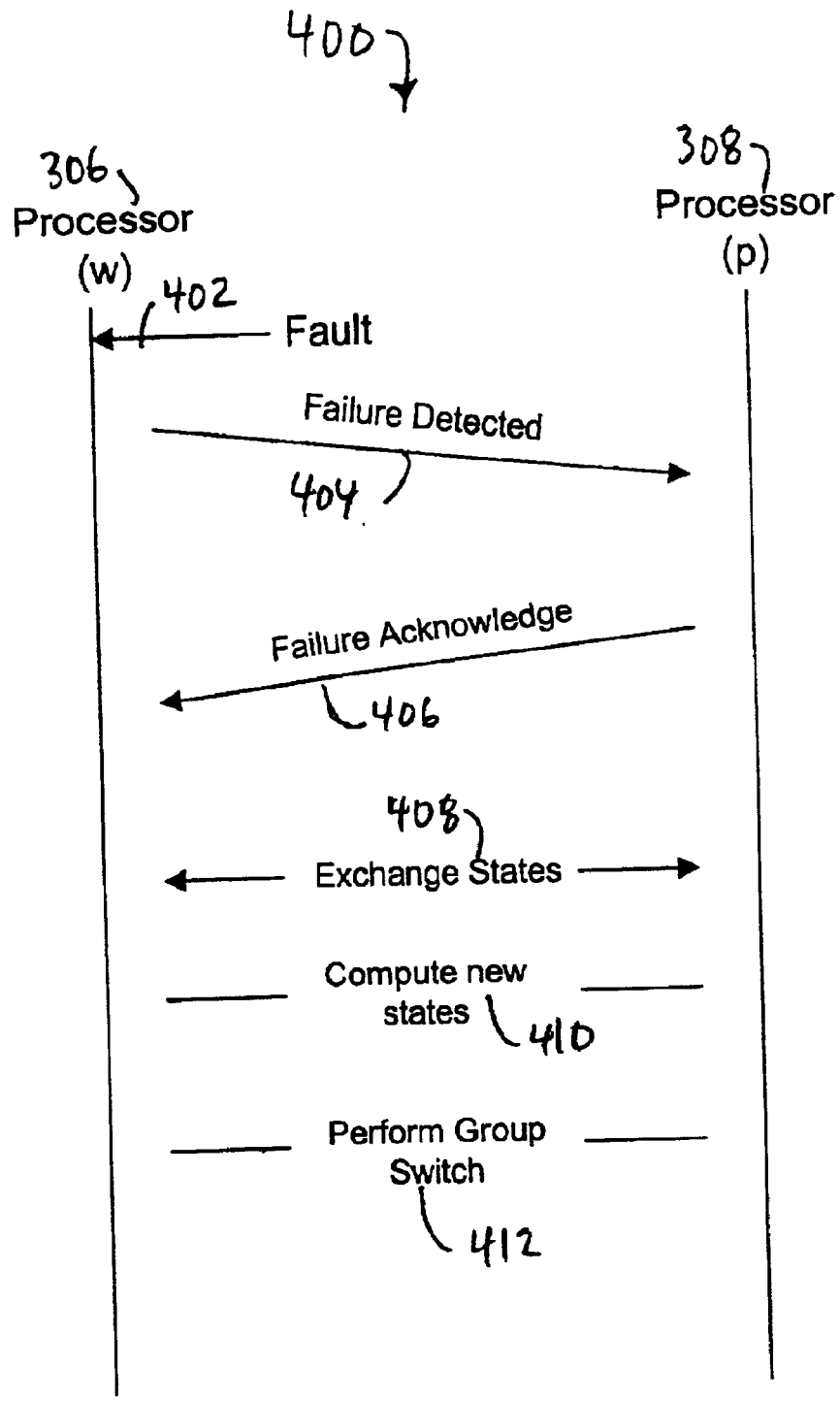
FIG. 4 shows exemplary messages exchanged between circuit cards in an ADM module in accordance with the present invention.

FIG. 4 shows exemplary messages 400 exchanged between processors on circuit assemblies in an ADM module to provide group-based protection switching in accordance with the present invention. For example, the messages 400 are exchanged between the processor 306 and the processor 308 using the communication channel 310. For the purposes of this description, it will be assumed that the ADM circuit assemblies are communicating with the network to send and receive bridged network traffic and that and that the ADM includes at least one selector having two switching engines as defined above.

During operation of the system, a fault is detected, as shown at 402. The fault may be detected by either circuit card, however, for the purpose of this description, it will be assumed that the fault is detected by the processor 306. For example, the processor 306 detects a fault associated with the received network traffic indicating that the received traffic is degraded. After detecting the fault, the processor 306 sends a failure detect message 404 to the processor 308 located on the other circuit assembly of the ADM. Upon receiving the failure detect message 404, the processor 308 responds with a failure acknowledge message 406.

Following the transmission and reception of the failure acknowledge message 406, each switching engine prepares state information that is exchanged with the other switching engine, as shown at 408. After exchanging states, the switching engines compute new states based on the fault detected, as shown at 410. After the new states are computed, a group switch is performed, as shown at 412. The group switch potentially includes all switching engines associated with all defined selectors. For example, the processors received the new activity states from the switching engines, and using these new states, direct low level APIs to perform a simultaneous group switch to reconfigure the ADM hardware.

As a result of the group switch, the switching engine states may change. For example, prior to the fault, a first switching engine associated with a first selector may have been in the active state, and a second switching engine associated with the first selector may have been in the standby state. After the group-switch, the state of the switching engines may be reversed based on the type of fault received.

Figure 5:
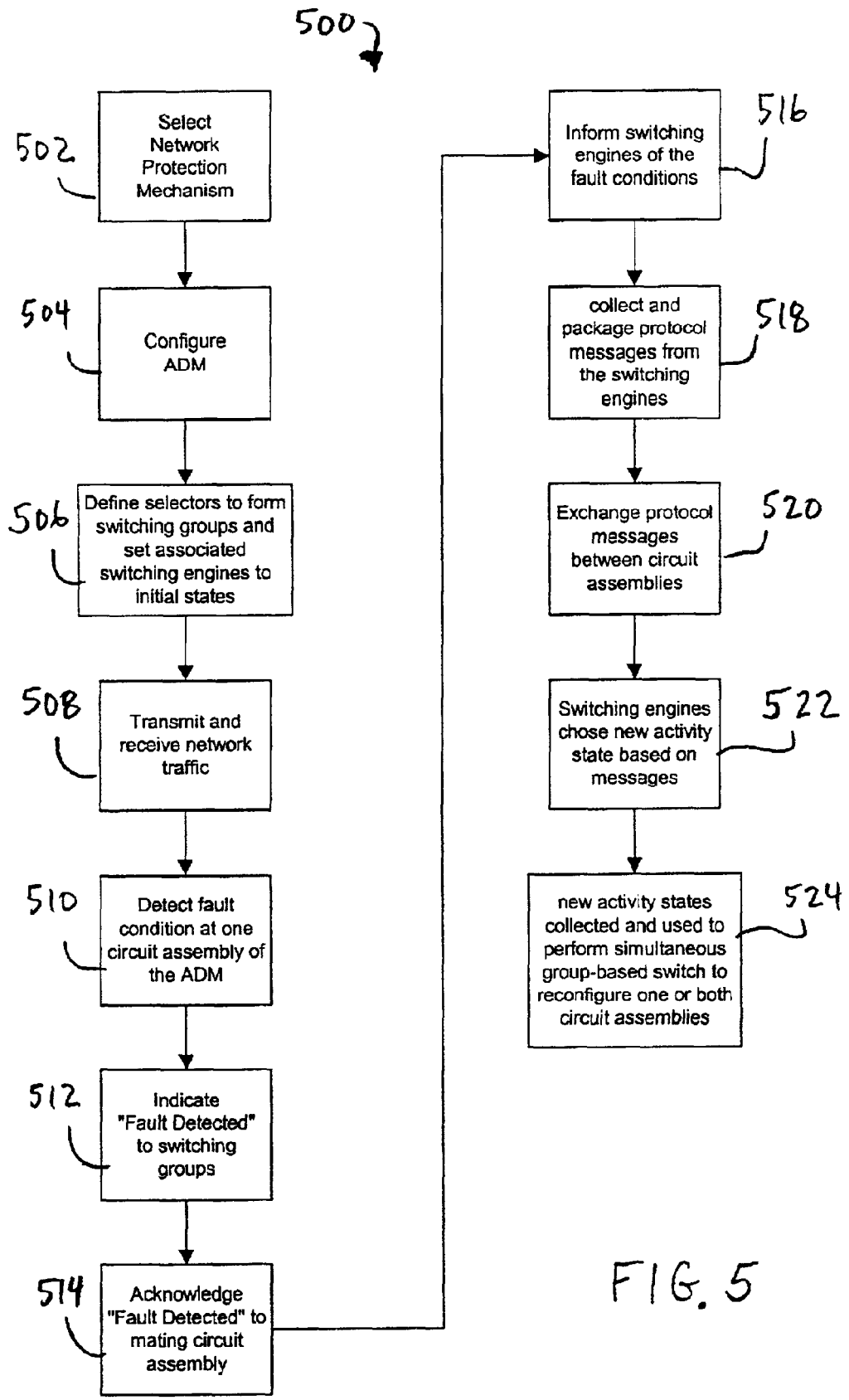
FIG. 5 shows a flow diagram for operating a network element in accordance with the present invention.

FIG. 5 shows an exemplary flow diagram for operating a network element to perform group-based distributed switching in accordance with the present invention. At block 502, a network protection mechanism is defined or selected. The network protection mechanism can be any type of protection mechanism, for example, SONET-style UPSR protection.

At block 504, ADM card assemblies constructed in accordance with the present invention are configured to operate with the above protection mechanism. At block 506, one or more selectors are defined that include switching engines used to switch the network data within the ADM. The selectors are initialized so that each switching engine is in the active or standby state.

At block 508, network traffic is transmitted and received using the ADM and the selected protection mechanism. At block 510, a fault is detected at one or both of the circuit assemblies of the ADM at the network element. The fault may be any type of fault, for example an LOP fault as defined above.

At block 512, an indication of the detected fault is sent to the processor on the mating ADM card. For example, if the processor on the first circuit assembly detects the fault, it sends an indication to the processor on the second circuit assembly about the fault.

At block 514, the indication of the fault is acknowledged by the mating circuit assembly. For example, if the processor on the second circuit assembly receives an indication from the processor on the first circuit assembly that a fault has been detected, the processor on the second circuit assembly sends an acknowledge indication to the processor on the first circuit assembly that the message was received.

At block 516, the switching engines are informed of the fault conditions. At block 518, protocol messages from the switching engines are collected and packaged. The protocol messages included state indications for the switching engines.

At block 520, the switching engines exchange the protocol messages with each other. For example, each selector includes two switching engines that exchange protocol messages. At block 522, the switching engines choose new activity states based on the received protocol messages and the detected fault. For example, the switching engines may reverse their activity state based on the detected fault.

At block 524, the processor receive the new activity states, and based on the new activity states, one or both of the processors on the circuit assemblies operate to reconfigure their respective circuit assembly. For example, the processors direct low level APIs to reconfigure ADM hardware to perform group-based protection switching. For example, the low level APIs may operate to switch TSI and/or PP components as shown in FIG. 3. Thus, in response to the detected fault, new activity states are determined and a group-based protection switch is performed. For example, as a result of the reconfiguration, the first circuit assembly may output protection traffic instead of working traffic at one of its low speed tributary outputs.

In the above flow diagram, a sequence of messages is used to implement group-based distributed protection switching. Although described with reference to a particular fault, in one or more other embodiments of the invention, it is possible to perform switching as a result of other types of faults or failures. For example, other type of faults or error conditions may be use to perform group-based protection switching. These conditions include, but are not limited to, a specific switch request, no request, wait to restore, manual switch, signal degrade, signal fail, force switch, or lock-out.

Exemplary Tributary Protection Implementations

In one or more embodiments included in the present invention, it is possible to perform group-based protection switching to protect tributary traffic, i.e., channels dropped to a local user via a low-speed interface. For example, SONET UPSR style APS is a protection architecture intended to protect the tributary traffic of the ADM from defects on the high-speed (OC-48) side of the ADM. It is similar, but not exactly the same as, SONET UPSR.

In the SONET UPSR style protection architecture, all tributary traffic is bridged (copied) at the entry point to the network and travels to the exit point of the network on diverse paths. At the exit point of the network, a selector function chooses which copy of the traffic to send to the tributary equipment. The selecting is performed independently (as in unidirectional 1+1protection) at both ends of a bi-directional circuit. Tributary traffic can be connected to the network in the following three ways.

1. To one port on each card assembly of an ADM with SONET 1+1 protection.
2. Through an O-UPSR splitter card to one port on each ADM card.
3. Directly to one port on either ADM card, with no protection.

Each of the above options is discussed in detail in the following text.

Unprotected Tributaries

Figure 6:
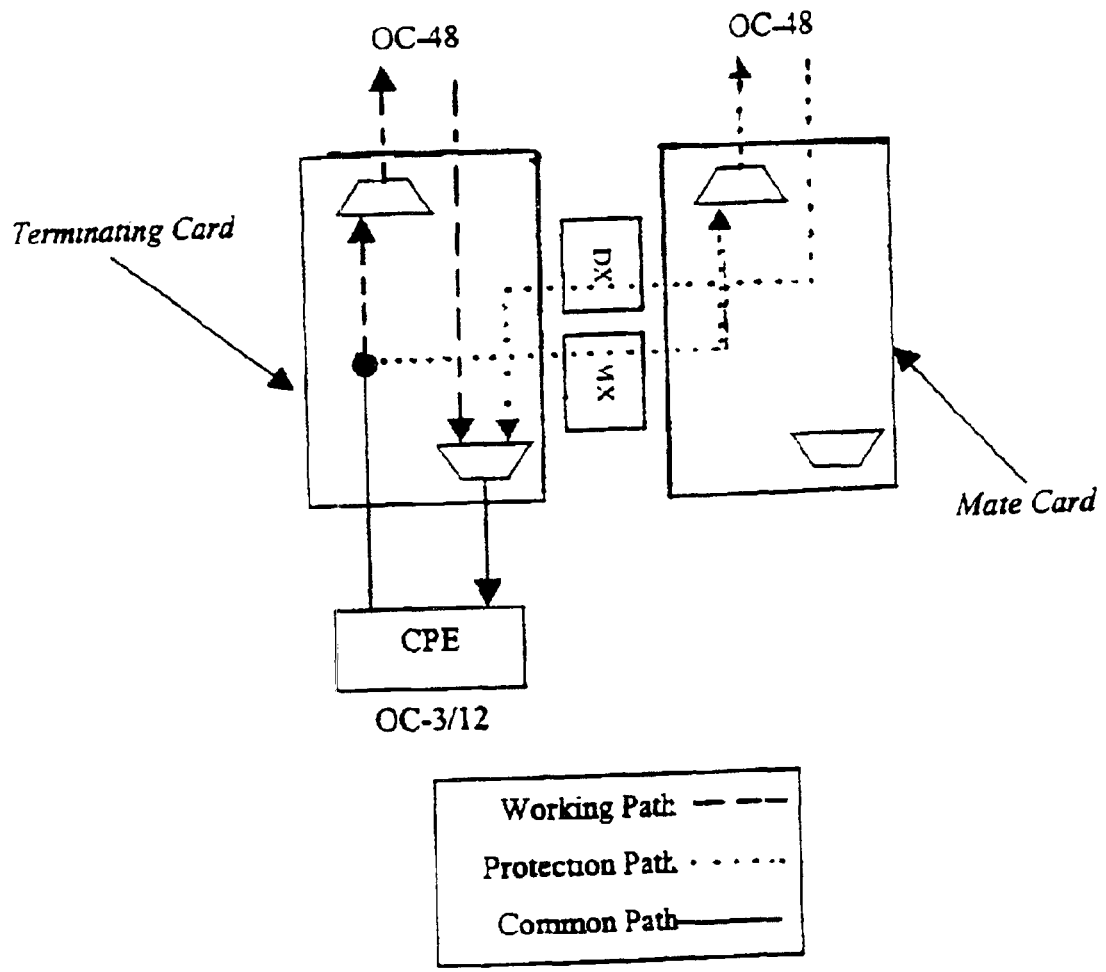
FIG. 6 shows a diagram for one embodiment for implementing group switching for unprotected tributaries in accordance with the present invention.

FIG. 6 shows a diagram for one embodiment for implementing group-switching for unprotected tributaries in accordance with the present invention. Unprotected tributaries can enter from any port on either ADM card. The input is bridged from the tributary input to the terminating card to selected timeslots on both line ports. On the terminating card, the traffic is re-mapped to the line side timeslots via an MX-side timeslot cross-connect. The traffic is bridged to the mate card via the MX-side protection bus and re-mapped to line side timeslots via an MX-side timeslot cross-connect.

On the terminating card, the timeslots carrying the traffic to be selected from are fed into a DX-side timeslot cross-connect. From the mate card, the traffic first passes from the line input to the DX-side protection bus, then enters the DX-side timeslot crossconnect on the terminating card. From a hardware perspective, selection is done on the terminating card using the DX-side timeslot cross-connect.

The choice of working and protection sides is arbitrary, and in FIG. 6, the working and protection paths can be interchanged. This configuration does not provide any protection for the "common" parts of the circuit. In particular, the fibers connecting the customer equipment to the ADM, and the terminating ADM card are single points of failure. However, if full protection is not required this configuration is the most cost-effective way of providing protection against line-side fiber failure.

SONET 1+1 Protection

Figure 7:
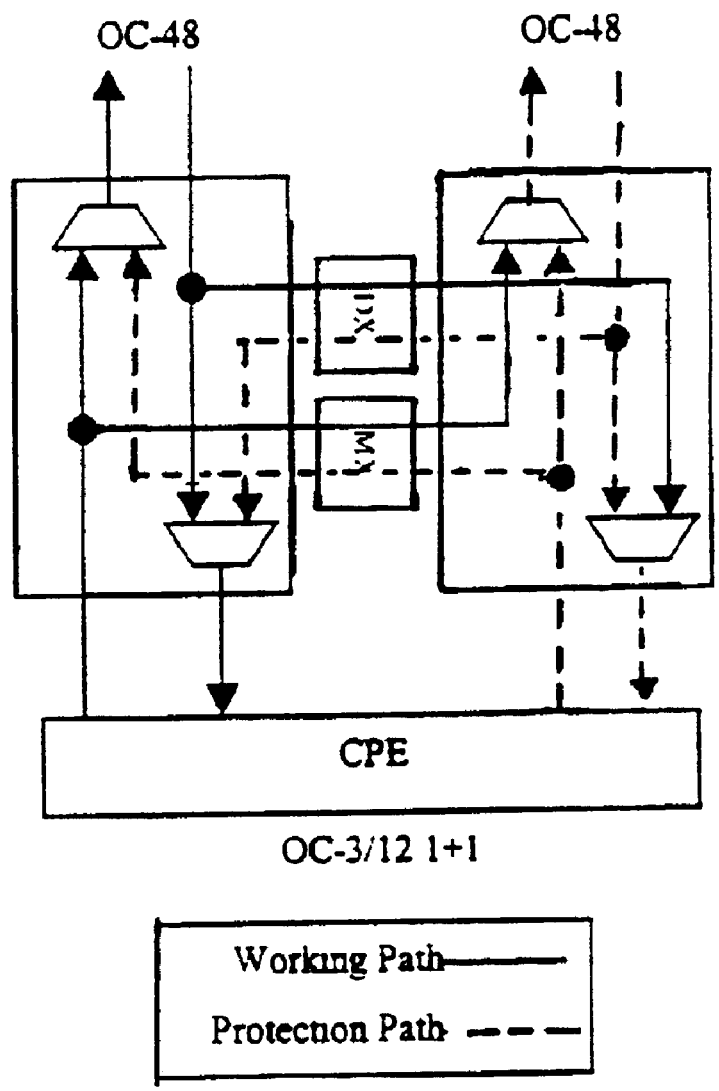
FIG. 7 shows a diagram of SONET 1+1 tributary protection in accordance with the present invention.

FIG. 7 shows a diagram of SONET 1+1 tributary protection in accordance with the present invention. Using this protection switching mechanism, customer traffic may be fully protected against failures of tributary fibers, line fibers, or the ADM equipment itself by combining the 1+1 line switching mechanism on the tributary side and SONET UPSR style protection on the line side. This requires usage of both the MX and DX protection buses to bridge traffic between cards appropriately.

On both ADM cards, incoming traffic from the 1+1 customer equipment is bridged to the mate card via the MX-side protection bus. The traffic to be sent out on the line-side timeslots is selected using the MX-side timeslot cross-connect. Similarly, SONET UPSR style protected traffic incoming from the OC-48 input is bridged to the mate card over the DX-side protection bus and selected with the DX-side timeslot cross-connect.

Choice of which side is working and protection is independent for 1+1 and UPSR. The card that terminates the protection fiber from the CPE may also terminate the working path from the OC-48 side. This is contrary to the diagram above that shows working and protection being terminated on separate cards in both cases. It may be preferable to assign working and protection as in the diagram because failure of the protection-only card will not require a protection switch.

Optical UPSR Protection

Figure 8:
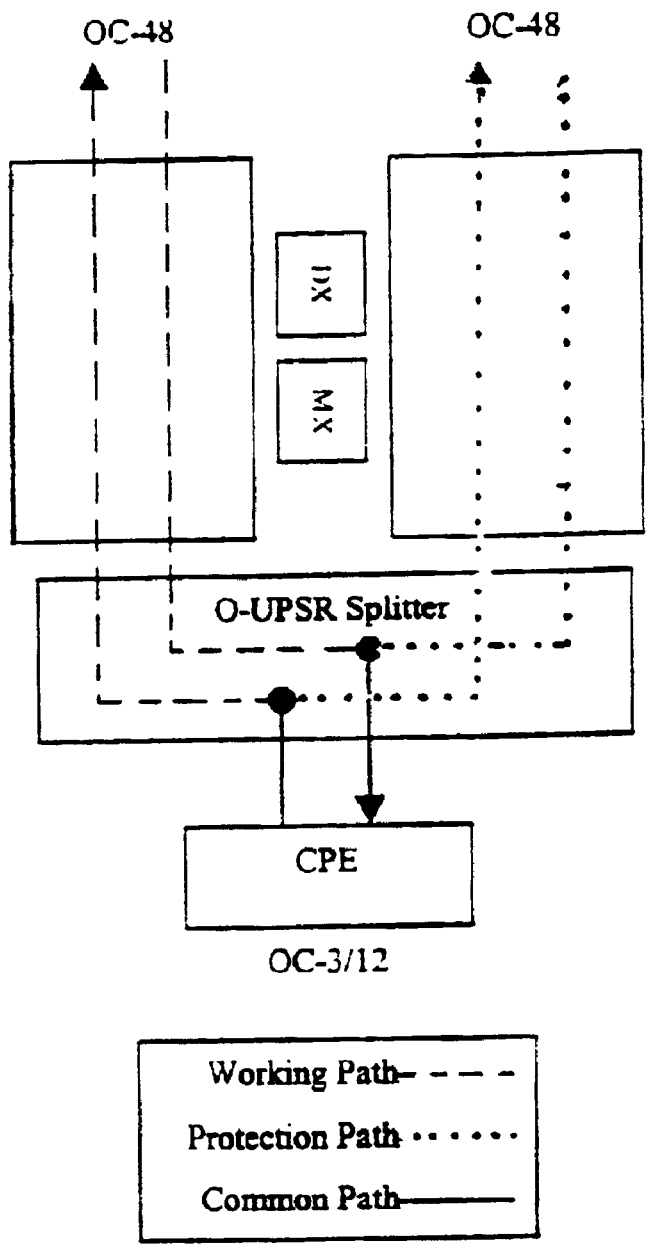
FIG. 8 shows a diagram of optical UPSR tributary protection in accordance with the present invention.

FIG. 8 shows a diagram of optical UPSR tributary protection in accordance with the present invention. The ADM O-UPSR behaves similarly to the original ONLINE optical UPSR. At each node in an ADM O-UPSR ring there is a pair of ADM cards, one east, one west. Customer traffic is passed through a 50/50 splitter and fed to one port on each of a pair of ADM cards, diversely routing it on set of STS timeslots both ways around the ring. The output from each ADM feeds to a coupler on the UPSR splitter card. Software is used to control which tributary laser on the ADM pair is turned on, thus acting as a selector for the east or west ADM. As with the O-UPSR, one path around the ring is designated as working and the other is designated as protection.

The common parts of the circuit that are not protected against failure are the fibers from the CPE and the splitter card itself. However, these consist of passive components that usually reside in a controlled environment (central office, etc.), so the risk of failure is minimal. This configuration is useful for extending connections between unprotected SONET NEs without decreasing link reliability.

It should be noted that all of the protection configurations discussed above do not show a network-wide view of the protection switching mechanisms. This is necessary because there is no restriction on how these protection mechanisms can be combined, even within the same circuit. For example, you could use 1+1 and UPSR combined protection at one end of an OC-3 circuit, and have only UPSR with unprotected tributaries at the other end. However, that example is not necessarily the most useful deployment option. Usually an OC-3 circuit that has 1+1 protection on one side will require 1+1 protection at the other end as well. However, once aggregation is taken into consideration, there really is no limit to the possible network configurations.

The present invention includes a distributed group-based switching system to perform protection switching in a communication network. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. System for providing distributed group-based protection switching at a network element in a communication network, wherein the communication network includes a plurality of interconnected network elements, and wherein the network element includes first and second card logic coupled to the communication network to transmit and receive network traffic, the system comprising:
   bus logic coupled between the first and second card logic, the bus logic operates to transmit the network traffic between the first and second card logic;

selector logic distributed between the first and second card logic, wherein the selector logic includes first and second switching engines that have associated activity states, respectively, that indicate how the network traffic is routed through the network element, and wherein the switching engines generate new activity states based on selected fault indicators; and a processing system operable to detect fault conditions and generate the selected fault indicators, and wherein the processing system operates to receive the new activity states from the switching engines and perform one or more switch reconfigurations at the network element based on the new activity states to implement the distributed group-based protection switching, wherein the processing system includes:
first processing logic located on the first card logic;
second processing logic located on the second card logic; and
a communication channel between the first processing logic and the second processing logic that allows messages to be exchanged between the first and second processing logic, wherein the messages include a fault detection message that indicates when a fault is detected; and a fault acknowledge message that indicates receipt of the fault detection message.

2. The system of claim 1, wherein the network traffic includes working traffic and protection traffic and the switching engines are coupled to receive and switch between the working and protection traffic.

3. The system of claim 2, wherein the switching engines have an active state and a standby state, and wherein when a selected switching engine is in the active state an output associated with the selected switching engine is enabled.

4. A method for providing distributed group-based protection switching at a network element in a communication network, wherein the communication network includes a plurality of interconnected network elements, and wherein the network element includes first and second card logic coupled to the communication network to transmit and receive network traffic, the method comprising:

busing the network traffic between the first and second card logic;

defining at least one selector that includes a first switching engine at the first card logic and a second switching engine at the second card logic;

initializing the first and second switching engines to have selected activity states;

detecting a fault condition including detecting the fault condition at one of the first card logic and the second card logic;

sending a first message between the first and second card logic indicating that the fault has been detected;

sending a second message to acknowledge receipt of the first message;

determining new activity states for the first and second switching engines based on the fault condition; and reconfiguring the first and second card logic based on the new activity states to implement the distributed group-based protection switching.

5. The method of claim 4, wherein the step of reconfiguring further comprises a step of controlling low level APIs to group-switch between working and protection network traffic.

6. The method of claim 5, wherein the step of determining the new activity states comprises a step of determining the new activity states based on the fault condition and a quality indicator associated with the network traffic.

* * * * *